US012640043B2

(12) United States Patent
Chen et al.

(10) Patent No.: US 12,640,043 B2
(45) Date of Patent: May 26, 2026

(54) SYSTEMS AND METHODS FOR REDUCING A LIKELIHOOD OF USING A GO AROUND MANEUVER WHILE LANDING AN AERIAL VEHICLE

(71) Applicant: HONEYWELL INTERNATIONAL INC., Charlotte, NC (US)

(72) Inventors: Xiaodong Chen, Shanghai (CN); Yang Liu, Shanghai (CN); Alan Hickman, Phoenix, AZ (US); Zuowei He, Shanghai (CN); Kun Wu, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 62 days.

(21) Appl. No.: 18/647,136

(22) Filed: Apr. 26, 2024

(65) Prior Publication Data

US 2025/0336304 A1      Oct. 30, 2025

(51) Int. Cl.
G08G 5/54          (2025.01)
G05D 1/654         (2024.01)
G05D 109/22        (2024.01)

(52) U.S. Cl.
CPC ............... G08G 5/54 (2025.01); G05D 1/654 (2024.01); G05D 2109/22 (2024.01)

(58) Field of Classification Search
CPC ....... G08G 5/54; G05D 1/654; G05D 2109/22
See application file for complete search history.

(56) References Cited

U.S. PATENT DOCUMENTS 9,915,953 B2 *   3/2018  Perrie .................. G05D 1/0676
10,202,204 B1 *  2/2019  Daidzic .................. B64D 45/04
(Continued)

FOREIGN PATENT DOCUMENTS

EP        4068041 A1    10/2022
RU        2373115 C1    11/2009

OTHER PUBLICATIONS

XP093307043_Konrad Gernot et al: "Development of a 1-15 Predictive Runway Overrun Awareness and Alerting System", Aviation Electronics Europe (AEE) Conference Exhibition 2018, Jun. 27, 2018 (Jun. 27, 2018), pp. 1-21, Retrieved from the Internet: URL:https://www.researchgate.net/profile/Gernot-Konrad/publication/326015711_Development_of_a_Predictive_Runway_Overrun_Awareness_and_Alerting_System/links/5b3385a64585150d23d63117/Development-of-a-Predictive-Runway-Overrun-Awareness-and-Alerting-Syste.

*Primary Examiner* — Thomas Ingram
(74) *Attorney, Agent, or Firm* — Ingrassia Fisher & Lorenz LLP

(57)                ABSTRACT

Systems and methods are provided for landing of an aerial vehicle on a runway. The systems include a runway overrun awareness and alerting system (ROAAS) configured to: monitor flight parameters during an approach phase and landing phase of a flight, and determine a landing distance value based on the flight parameters, an automatic flight control system (AFCS) including an automatic flight runway overrun awareness and alerting system (AF-ROAAS) protection mode configured to adjust energy of the aerial vehicle during the approach phase and/or the landing phase to reduce a likelihood of the aerial vehicle overrunning the runway, and a controller configured to: compare the landing distance value and an available runway length value to a threshold criterion, wherein the threshold criterion corresponds to the likelihood of the vehicle overrunning the runway, and automatically activating the AF-ROAAS protection mode in response to a determination that the threshold criterion is met.

20 Claims, 3 Drawing Sheets

(56)                       References Cited

U.S. PATENT DOCUMENTS

| | | | |
|---|---|---|---|
| 11,282,400 B2 * | 3/2022 | Byxbe | B64D 45/08 |
| 11,545,037 B2 * | 1/2023 | Byxbe | G08G 5/56 |
| 11,875,692 B2 * | 1/2024 | He | G08G 5/51 |
| 2014/0257602 A1 | 9/2014 | Gaston | |
| 2017/0249851 A1 * | 8/2017 | Marques | G08G 5/21 |
| 2022/0343778 A1 | 10/2022 | Yankanchi et al. | |
| 2022/0358847 A1 | 11/2022 | Subramaniyan et al. | |
| 2023/0137045 A1 | 5/2023 | Maalioune et al. | |
| 2023/0316937 A1 * | 10/2023 | Zelman | G08G 5/54 |
| | | | 701/18 |
| 2024/0021093 A1 | 1/2024 | Koduru et al. | |
| 2024/0062664 A1 | 2/2024 | He | |
| 2025/0201132 A1 * | 6/2025 | Boyer | G08G 5/21 |
| 2025/0245767 A1 * | 7/2025 | Pollard | G06Q 10/06313 |

* cited by examiner

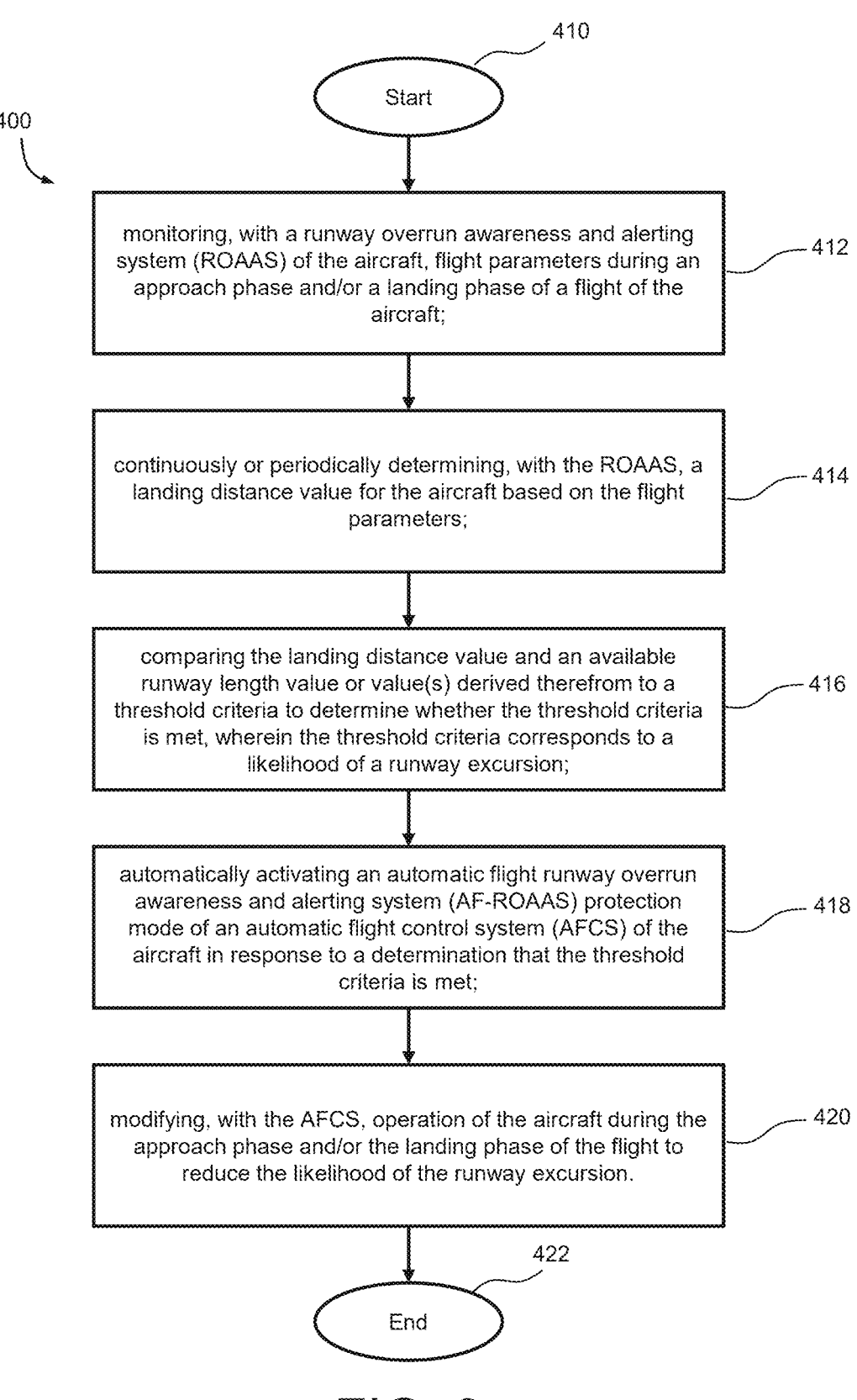

410

400

Start monitoring, with a runway overrun awareness and alerting system (ROAAS) of the aircraft, flight parameters during an approach phase and/or a landing phase of a flight of the aircraft;

412 continuously or periodically determining, with the ROAAS, a landing distance value for the aircraft based on the flight parameters;

414 comparing the landing distance value and an available runway length value or value(s) derived therefrom to a threshold criteria to determine whether the threshold criteria is met, wherein the threshold criteria corresponds to a likelihood of a runway excursion;

416 automatically activating an automatic flight runway overrun awareness and alerting system (AF-ROAAS) protection mode of an automatic flight control system (AFCS) of the aircraft in response to a determination that the threshold criteria is met;

418 modifying, with the AFCS, operation of the aircraft during the approach phase and/or the landing phase of the flight to reduce the likelihood of the runway excursion.

420

End

SYSTEMS AND METHODS FOR REDUCING A LIKELIHOOD OF USING A GO AROUND MANEUVER WHILE LANDING AN AERIAL VEHICLE

TECHNICAL FIELD

The present invention generally relates to aerial vehicles during approach and landing phases of a flight, and more particularly relates to systems and methods for landing of an aerial vehicle on a runway with a reduced likelihood of performing a go around maneuver.

BACKGROUND

Various systems may be implemented onboard aerial vehicle to promote safety during the approach and landing phases of a flight, such as an Automatic Flight Control System (AFCS) and/or a Runway Overrun Awareness and Alerting System (ROAAS). AFCS uses sensor data from various aerial vehicle systems to automatically fly the aerial vehicle in accordance with pilot commands (e.g., selected flight modes and targets). ROAAS provides information and recommendations to pilots during approach, and may alert the pilot of potential runway excursions while allowing enough time for an appropriate preventative action to be taken, such as a go around maneuver when the landing is aborted, the aerial vehicle gains altitude, and the landing is attempted again.

Despite the benefits of these systems, there is an ongoing desire for systems and methods that further promote safety during the approach and landing phases of a flight. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various embodiments, a method is provided for an aerial vehicle. The method includes monitoring, with a runway overrun awareness and alerting system (ROAAS) of the aerial vehicle, flight parameters during an approach phase and/or a landing phase of a flight of the aerial vehicle, continuously or periodically determining, with the ROAAS, a landing distance value for the aerial vehicle based on the flight parameters, comparing the landing distance value and an available runway length value or value(s) derived therefrom to a threshold criterion to determine whether the threshold criterion is met, wherein the threshold criterion corresponds to a likelihood of a runway excursion, automatically activating an automatic flight runway overrun awareness and alerting system (AF-ROAAS) protection mode of an automatic flight control system (AFCS) of the aerial vehicle in response to a determination that the threshold criterion is met, modifying, with the AFCS, operation of the aerial vehicle during the approach phase and/or the landing phase of the flight to reduce the likelihood of the runway excursion.

In various embodiments, a system is provided for an aerial vehicle. The system includes a runway overrun awareness and alerting system (ROAAS) configured to: monitor flight parameters during an approach phase and landing phase of a flight, and continuously or periodically determine a landing distance value for the aerial vehicle based on the flight parameters, an automatic flight control system (AFCS) including an automatic flight runway overrun awareness and alerting system (AF-ROAAS) protection mode configured to adjust the energy of the aerial vehicle during the approach phase and/or the landing phase of the flight to reduce a likelihood of the aerial vehicle overrunning the runway, and a controller in operable communication with the ROAAS and the AFCS, the controller configured to, with one or more processors: compare the landing distance value and an available runway length value or overrun-related value(s) derived therefrom to a threshold criterion to determine whether the threshold criterion is met, wherein the threshold criterion corresponds to the likelihood of the aerial vehicle overrunning the runway, and automatically activating the AF-ROAAS protection mode in response to a determination that the threshold criterion is met.

In various embodiments, an aerial vehicle is provided that includes a runway overrun awareness and alerting system (ROAAS) configured to: monitor flight parameters received from a sensor system of the aerial vehicle during an approach phase and landing phase of a flight, and continuously or periodically determine a landing distance value for the aerial vehicle based on the flight parameters, an automatic flight control system (AFCS) including an automatic flight runway overrun awareness and alerting system (AF-ROAAS) protection mode configured to adjust the energy of the aerial vehicle during the approach phase and/or the landing phase of the flight to reduce a likelihood of the aerial vehicle overrunning the runway, and a controller in operable communication with the ROAAS and the AFCS, the controller configured to, with one or more processors: compare the landing distance value and an available runway length value or overrun-related value(s) derived therefrom to a threshold criterion to determine whether the threshold criterion is met, wherein the threshold criterion corresponds to the likelihood of the aerial vehicle overrunning the runway, and automatically activating the AF-ROAAS protection mode in response to a determination that the threshold criterion is met.

Furthermore, other desirable features and characteristics of the systems and methods will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein:

FIG. 3 is a flowchart illustrating an exemplary method for reducing a likelihood of performing a go around maneuver during approach and landing phases of a flight of an aerial vehicle in accordance with an embodiment.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein provide for an excursion and go around prevention system for an aerial vehicle to promote safety of the vehicle during the approach and landing phases of a flight. In some embodiments, the system includes integration between an Automatic Flight Control System (AFCS) and a Runway Overrun Awareness and Alerting System (ROAAS). In some embodiments, the system is capable of managing an energy state of the vehicle during the approach and landing phases to reduce the likelihood of an excursion and/or a likelihood of performing a go around maneuver.

It should be noted that the term aerial vehicle may include any type of aircraft which, as utilized herein, may include any manned or unmanned object capable of flight. Examples of aerial vehicles and aircraft may include, but are not limited to, fixed-wing aerial vehicles (e.g., propeller-powered or jet powered), rotary-wing aerial vehicles (e.g., helicopters, for which the landing zone could be a runway or a landing pad), manned aircraft, unmanned aircraft (e.g., unmanned aerial vehicles, or UAVs), delivery drones, etc. For convenience, the systems and methods will be described in reference to a manned airplane; however, as noted the systems and methods are not limited to such application.

Figure 1:
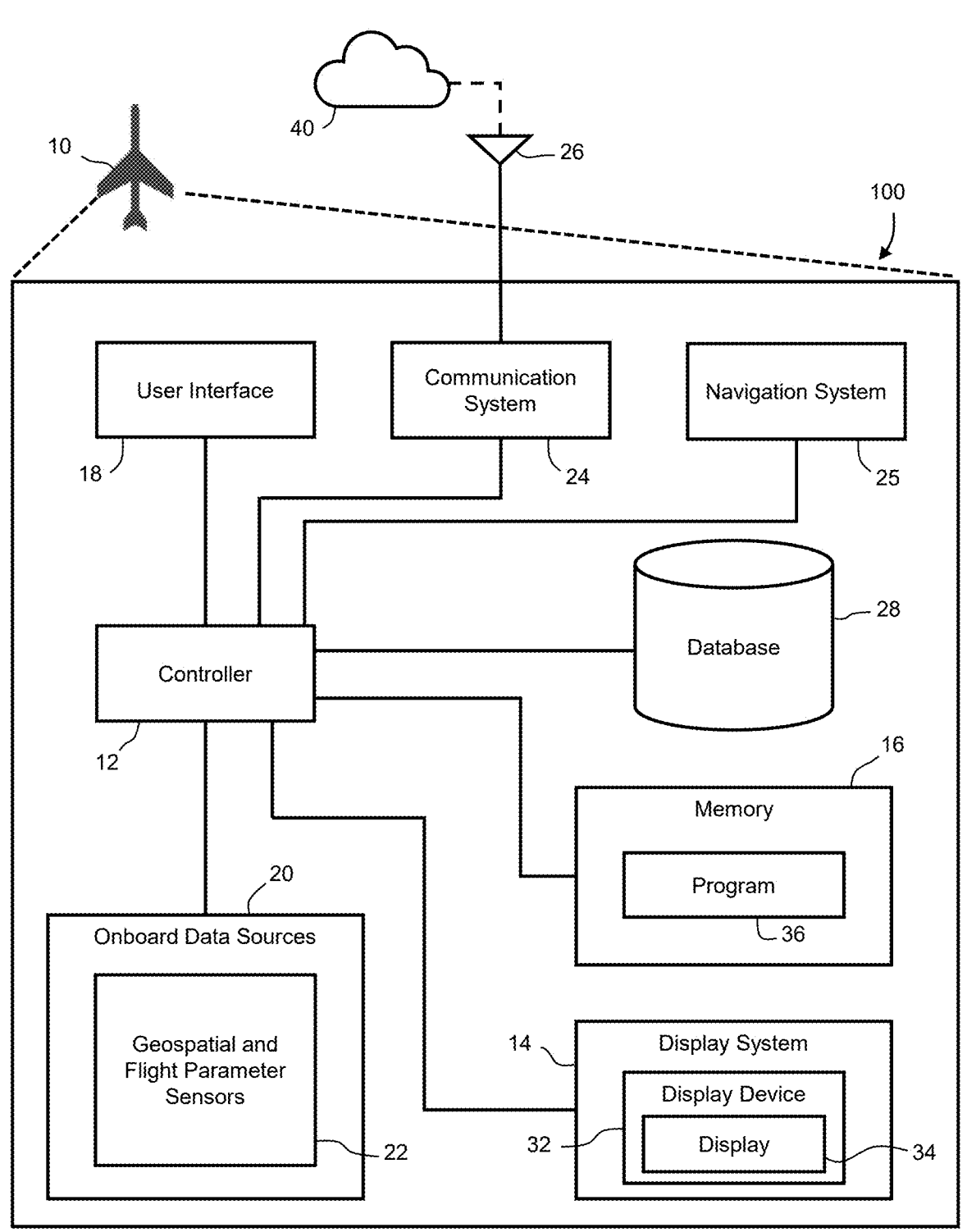
FIG. 1 schematically represents an aerial vehicle and components of an excursion prevention system thereof in accordance with an embodiment.

Referring now to FIG. 1, a vehicle 10, in this example an airplane, and certain systems thereof are illustrated in accordance with an exemplary and nonlimiting embodiment of the present disclosure. An excursion and go around prevention system 100 may be utilized onboard the vehicle 10 as described herein. As schematically depicted in FIG. 1, the system 100 includes and/or is functionally coupled to the following components or subsystems, each of which may assume the form of a single device or multiple interconnected devices, including, but not limited to, a controller 12 operationally coupled to: at least one display device 32, which may optionally be part of a larger on-board display system 14; computer-readable storage media or memory 16; an optional user interface 18, onboard data sources 20 including, for example, an array of geospatial and flight parameter sensors 22, and a navigation system 25. The system 100 may be separate from or integrated within a flight management system (FMS) and/or a flight control system (FCS). The system 100 may also contain a communication system 24 including an antenna 26, which may wirelessly transmit data to and receive data from various external sources 40 physically and/or geographically remote to the system 100 and/or the vehicle 10.

Although schematically illustrated in FIG. 1 as a single unit, the individual elements and components of the system 100 can be implemented in a distributed manner utilizing any practical number of physically distinct and operatively interconnected pieces of hardware or equipment. When the system 100 is utilized as described herein, the various components of the system 100 will typically all be located onboard the vehicle 10.

The term "controller," as appearing herein, broadly encompasses those components utilized to carry-out or otherwise support the processing functionalities of the system 100. Accordingly, the controller 12 can encompass or may be associated with any number of individual processors, flight control computers, navigational equipment pieces, computer-readable memories (including or in addition to the memory 16), power supplies, storage devices, interface cards, and other standardized components.

In various embodiments, the controller 12 includes at least one processor, a communication bus, and a computer readable storage device or media. The processor performs the computation and control functions of the controller 12. The processor can be any custom made or commercially available processor, a central processing unit (CPU), a graphics processing unit (GPU), an auxiliary processor among several processors associated with the controller 12, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 12. The bus serves to transmit programs, data, status and other information or signals between the various components of the vehicle 10. The bus can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor, receive and process signals from the sensors 22, perform logic, calculations, methods and/or algorithms, and generate data based on the logic, calculations, methods, and/or algorithms. Although only one controller 12 is shown in FIG. 1, embodiments of the vehicle 10 can include any number of controllers 12 that communicate over any suitable communication medium or a combination of communication mediums and that cooperate to process the sensor signals, perform logic, calculations, methods, and/or algorithms, and generate data. In various embodiments, the controller 12 includes or cooperates with at least one firmware and software program (generally, computer-readable instructions that embody an algorithm) for carrying-out the various process tasks, calculations, and control/display functions described herein. During operation, the controller 12 may be programmed with and execute at least one firmware or software program, for example, a program 36, that embodies one or more algorithms, to thereby perform the various process steps, tasks, calculations, and control/display functions described herein.

The controller 12 may exchange data with one or more external sources 40 to support operation of the system 100 in various embodiments. In this case, bidirectional wireless data exchange may occur via the communication system 24 over a communications network, such as a public or private network implemented in accordance with Transmission Control Protocol/Internet Protocol architectures or other conventional protocol standards. Encryption and mutual authentication techniques may be applied, as appropriate, to ensure data security.

In various embodiments, the communication system 24 is configured to support instantaneous (i.e., real time or current) communications between on-board systems, the controller 12, and the one or more external sources 40. The communication system 24 may incorporate one or more transmitters, receivers, and the supporting communications hardware and software required for components of the system 100 to communicate as described herein. In various embodiments, the communication system 24 may have additional communications not directly relied upon herein, such as bidirectional pilot-to-ATC (air traffic control) communications via a datalink, and any other suitable radio communication system that supports communications between the vehicle 10 and various external source(s).

The memory 16 can encompass any number and type of storage media suitable for storing computer-readable code or instructions, such as the program 36, as well as other data generally supporting the operation of the system 100. As can be appreciated, the memory 16 may be part of the controller 12, separate from the controller 12, or part of the controller 12 and part of a separate system. The memory 16 can be any suitable type of storage apparatus, including various different types of direct access storage and/or other memory devices.

A source of information suitable for operating one or more systems of the vehicle 10 may be part of the system 100. In certain embodiments, the source is one or more databases 28 employed to receive and store map data, which may be updated on a periodic or iterative basis to ensure data timeliness. In various embodiments, the map data may include various terrain and manmade object locations and elevations and may be stored in the memory 16 or in the one or more databases 28, and referenced by the program 36. In various embodiments, these databases 28 may be available online and accessible remotely by a suitable wireless communication system, such as the communication system 24.

The onboard data sources 20, including the sensors 22, supply various types of data and/or measurements to the controller 12. In various embodiments, the sensors 22 supply, without limitation, one or more of: inertial reference system measurements providing a location, Flight Path Angle (FPA) measurements, airspeed data, groundspeed data, vertical speed data, vertical acceleration data, altitude data, attitude data including pitch and roll measurements, yaw data, data related to ownship weight, time/date information, heading information, data related to atmospheric conditions, flight path data, flight track data, radar altitude data, geometric altitude data, wind speed and direction data. Further, in certain embodiments of the system 100, the controller 12, and the other components of the system 100 may be included within or cooperate with any number and type of systems commonly deployed onboard aircraft including, for example, an FMS, an Attitude Heading Reference System (AHRS), an Instrument Landing System (ILS), and/or an Inertial Reference System (IRS).

The display device 32 can include any number and type of image generating devices on which one or more avionic displays 34 may be produced. In various embodiments, the display device 32 may be affixed to the static structure of the vehicle 10 cockpit as, for example, a Head Down Display (HDD) or Head Up Display (HUD) unit. Alternatively, the display device 32 may assume the form of a movable display device (e.g., a pilot-worn display device) or a portable display device, such as an Electronic Flight Bag (EFB), a laptop, or a tablet computer carried into the vehicle 10 cockpit by a pilot.

At least one avionic display 34 is generated on display device 32 during operation of the system 100. The term "avionic display" as used herein is synonymous with the terms "aircraft-related display" and "cockpit display" and encompasses displays generated in textual, graphical, cartographical, and other formats. The system 100 can generate various types of lateral and vertical avionic displays 34 on which symbology, text annunciations, and other graphics pertaining to flight planning are presented for a pilot to view. The avionic display 34 generated and controlled by the system 100 can include alphanumerical input displays of the type commonly presented on the screens of multi-function control and display units (MCDUs), as well as Control Display Units (CDUs) generally. Specifically, certain embodiments of the avionic displays 34 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

In various embodiments, a human-machine interface, such as a touch screen display, may be implemented as an integration of the user interface 18 and the display device 32. Via various display and graphics systems processes, the controller 12 may command and control the touch screen display generating a variety of graphical user interface (GUI) objects or elements, for example, buttons, sliders, and the like, which are used to prompt a user to interact with the human-machine interface to provide user input, and to activate respective functions and provide user feedback, responsive to received user input at the GUI element.

The navigation system 25 can provide navigation data associated with the aerial vehicle's current position and flight direction (e.g., heading, course, track, etc.) to the controller 12. As such, the navigation system 25 can include, for example, an inertial navigation system, a satellite navigation system (e.g., Global Positioning System) receiver, VLF/OMEGA, Loran C, VOR/DME, DME/DME, IRS, attitude sensors, or the navigation information can come from a flight management system. The navigation data provided to the controller 12 can also include information about the aerial vehicle's airspeed, ground speed, altitude (e.g., relative to sea level), pitch, and other important flight information. In any event, for this example embodiment, the navigation system 25 can include any suitable position and direction determination devices that are capable of providing the controller 12 with at least an aerial vehicle's current position (e.g., in latitudinal and longitudinal form), the real-time direction (heading, course, track, etc.) of the aerial vehicle in its flight path, and other important flight information (e.g., airspeed, altitude, pitch, attitude, etc.).

Figure 2:
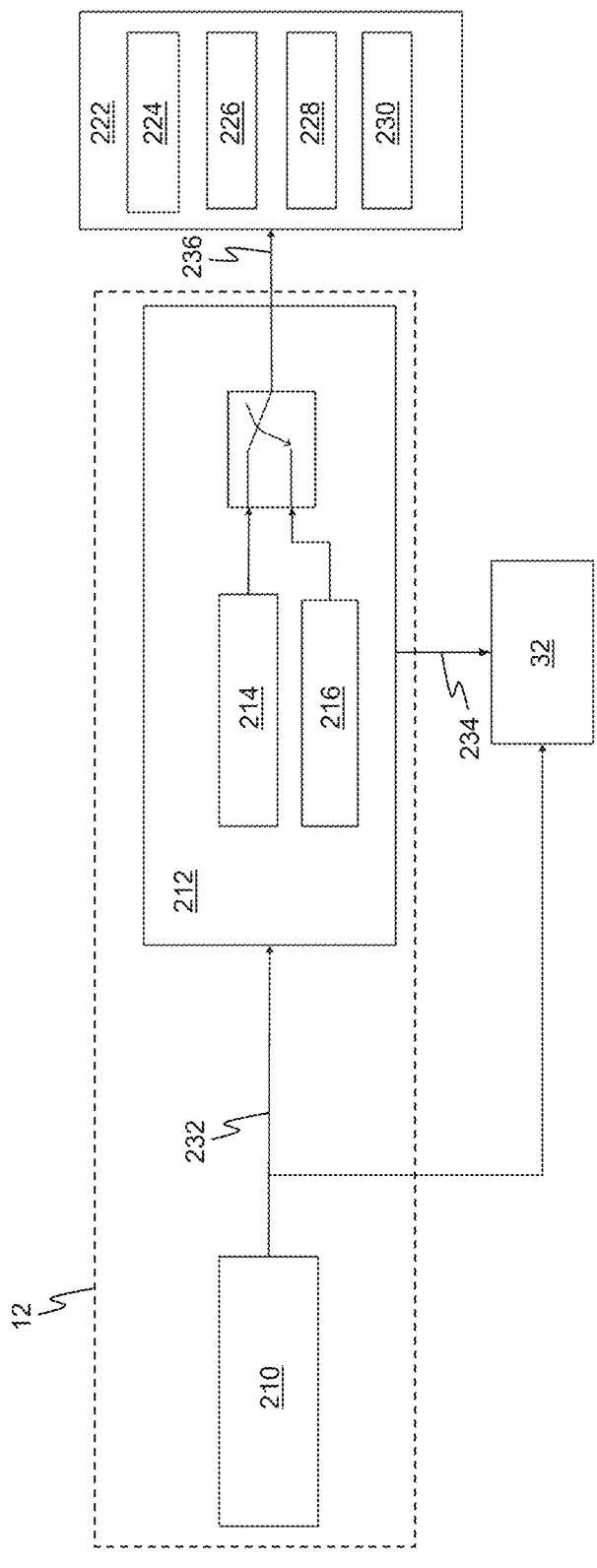
FIG. 2 schematically represents operation of the excursion prevention system of FIG. 1 in accordance with an embodiment.

FIG. 2 schematically represents additional aspects of the system 100 of FIG. 1 in accordance with various embodiments. In this embodiment, the system 100 includes a ROAAS 210 and an AFCS 212 operating on the controller 12. The ROAAS 210 is configured to monitor for runway excursion conditions (e.g., potential for overrun) during the approach and landing phases of the flight. For example, while on approach to a runway, the ROAAS 210 may monitor the energy state of the vehicle 10 along with its position and heading relative to the parameters of the runway (e.g., the length and orientation of the runway, environmental conditions that may affect the landing, etc.). If one or more conditions or combinations of conditions meet or exceed predetermined threshold levels, the ROAAS 210 may generate a notification or alert. As an example, the aerial vehicle state may indicate a glide path consistent with approach and landing, but airspeed may be in excess of a speed consistent with the current aerial vehicle position relative to the runway, and/or a tailwind may be present. Based on these observations, the ROAAS 210 may conclude that there is a likelihood of a runway excursion, and that the threshold has been met for a notification or alert.

The AFCS 212 is configured to automate various operations of the vehicle 10 in accordance with pilot commands (e.g., selected flight modes or targets). The AFCS 212 may consider various inputs and adjust the aerial vehicle's flight control surfaces, such as the ailerons, elevators, and the rudder to, for example, maintain the vehicle 10 on the desired trajectory as programmed by the pilot. In some embodiments, the AFCS 212 may be configured to provide for automatic control of the vehicle 10 during the approach and landing phases of the flight. In some embodiments, the AFCS 212 may include a Flight Management System (FMS), an Autothrottle System, an Autopilot System, a Flight Director System, and/or an Attitude and Heading Reference System (AHRS).

In various embodiments, the system 100 integrates functions of or otherwise provides communication between the ROAAS 210 and the AFCS 212 to promote efficient operation and safety of the vehicle 10 during the approach and landing phases. For example, during the approach phase the pilot and/or the AFCS 212 may control operation of the vehicle 10 to maintain the vehicle 10 along a glide path that has an intercept point on the runway. During these phases, the ROAAS 210 receives various flight data generated by the onboard data sources 20, such as the sensors 22, that may be indicative of flight parameters of the vehicle 10 and/or the environment. For example, the flight data may include aerial vehicle speed, current altitude, aerial vehicle state, autobrake setting, landing weight, wind conditions, dry and wet runway state, etc. The ROAAS 210 is configured to determine a landing distance value for the vehicle 10 based on the flight parameters and a published available runway length value retrieved from a database (e.g., the database 28).

The landing distance value and the available runway length value or value(s) derived therefrom may be compared to an excursion threshold criterion to determine whether the excursion threshold criterion is met. In some embodiments, this comparison may include dividing the landing distance value by the available runway length value to determine a status value, and then comparing the status value to a status threshold value (e.g., 1). In such embodiments, the determination that the excursion threshold criterion is met may occur when the status value exceeds the status threshold value. The comparison and determination relating to the possibility of the excursion may be performed by the ROAAS 210, the AFCS 212, or another system separate from both.

The ROAAS 210 generates ROAAS data 232 that includes various data indicating information related to the possibility of runway excursion conditions. If the above noted comparison is performed by the ROAAS 210, the ROAAS data 232 may include whether the excursion threshold criterion has been met. If the comparison is performed by the AFCS 212, the ROAAS data 232 may include the landing distance value and, optionally, the available runway length value.

In various embodiments, the AFCS 212 receives as input the ROAAS data 232 generated by the ROAAS 210. In some embodiments, the AFCS 212 may retrieve the available runway length value from a database. In various embodiments, the AFCS 212 processes the ROAAS data 232 and, in response to a determination that the excursion threshold criterion is met, the AFCS 212 may activate an automatic flight runway overrun awareness and alerting system (AF-ROAAS) protection mode 214 of the AFCS 212. In some embodiments, the AF-ROAAS protection mode 214 may generate a notification or alert for the pilot that includes recommended corrective actions and/or related information relating to modifying the operation of the vehicle 10 in a manner configured to reduce the likelihood of a runway excursion. For example, a notification may be generated on the display device 32 recommending that the pilot to reduce thrust, and/or to deploy one or more drag devices of the vehicle 10, and/or to adjust the flare maneuver, reverse thrust or brake settings to reduce the energy state of the vehicle 10.

The AF-ROAAS protection mode 214 may be configured to modify the operation of the vehicle 10, automatically or in response to commands from the pilot, in a manner configured to reduce the likelihood of the runway excursion. In some examples in which the AF-ROAAS protection mode 214 is active during the approach phase, the AFCS 212 may automatically adjust the energy of the vehicle 10 by adjusting control parameters such as, but not limited to, use of more aggressive control gains and/or opening the rate/acceleration limits for thrust reduction, and/or activating one or more drag devices of the vehicle 10. In some examples in which the AF-ROAAS protection mode 314 is active during the landing phase, and the AFCS 312 may automatically modify operation of the vehicle 10 by adjusting control parameters such as, but not limited to, adjusting the flare height, applying a higher g load flare maneuver, idling thrust, and/or adjusting reverse thrust and/or braking settings to reduce the landing distance during landing.

In some embodiments, the recommendations provided by and/or the corrective actions performed by the AF-ROAAS protection mode 214 may vary based on certain parameters. For example, the AF-ROAAS protection mode 214 may automatically generate a notification or alert in response to the AF-ROAAS protection mode 214 being active when the vehicle 10 drops below a threshold altitude (e.g., 200 ft). In some embodiments, the alert may request authorization for the AFCS 212 to perform an automatic go around maneuver. In such examples, if the AFCS 212 receives a go around command from the pilot, the AFCS 212 may switch from the AF-ROAAS protection mode 214 to a go around mode 216 and then perform the automatic go around maneuver. In some embodiments, the AFCS 212 may automatically switch to the go around mode 216 in response to emergency criteria.

The AFCS 212 may generate AFCS data 236 that includes various data configured to modify the operation of the vehicle 10, and may transmit the AFCS data 236 to one or more other systems of the vehicle 10, such as another control system, one or more actuators, etc. In the examples represented in FIG. 2, the AFCS data 236 is transmitted to one or more other components 222 of the vehicle 10, such as an engine 224, a drag device 226, a control surface 228, or a brake system 230. Recommendations and/or other information provided by the ROAAS 210 (e.g., the ROAAS data 232) and the AFCS 212 (e.g., AFCS notification/alert data 234) may be displayed on the display device 32.

The systems disclosed herein, including the system 100, provide for methods for reducing a likelihood of using a go around maneuver while landing an aerial vehicle during the approach and landing phases of a flight. For example, FIG. 3 is a flowchart illustrating an exemplary method 400 for performing an automated go around maneuver. The method 400 may start at 410. In some embodiments, the method 400 may automatically start upon initiation of the ROAAS, upon entering the approach and/or landing phases of a flight, or in response to another event. In some embodiments, the method 400 may start in response to receiving a command from the pilot.

At 412, the method 400 may include monitoring, with a ROAAS of an aerial vehicle, flight parameters during an approach phase and/or a landing phase of a flight of the vehicle. At 414, the method 400 may include continuously or periodically determining, with the ROAAS, a landing distance value for the vehicle based on the flight parameters. In some embodiments, the method 400 may include a determination as to whether the output of the ROAAS system is valid and/or reliable. In some examples, this determination may include checking that the ROAAS is operating and/or checking for error messages associated with the ROAAS. If the output is determined to be invalid and/or unreliable, the method 400 may include continuing to monitor the output of the ROAAS until the output is determined to be valid and/or reliable.

At 416, the method 400 may include comparing the landing distance value and an available runway length value or value(s) derived therefrom to a threshold criterion to determine whether the threshold criterion is met, wherein threshold criterion corresponds to a likelihood of a runway excursion. If the threshold criterion is not met at 416, the method 400 may include continuing to monitor the output of the ROAAS and repeating the comparison until the threshold criterion is met. As an example, the method 400 may include dividing the landing distance value by the available runway length value to determine a status value, and then comparing the status value to a threshold value (e.g., 1). If the status value is, for example, less than the threshold value, then the method 400 may include receiving new landing distance and available runway distance values from the ROAAS system and repeating the comparison. If the status value exceeds the threshold value at 418, the method 400 may include determining that the threshold criterion is met.

At 418, the method 400 may include automatically activating an automatic flight runway overrun awareness and alerting system (AF-ROAAS) protection mode of an automatic flight control system (AFCS) of the vehicle in response to a determination that the threshold criterion is met.

At 420, the method 400 may include modifying, with the AFCS, operation of the vehicle during the approach phase and/or the landing phase of the flight to reduce the likelihood of the runway excursion. In some examples, the AF-ROAAS protection mode may automatically adjust one or more parameters of the vehicle operation to modify the energy state of the vehicle. In some examples, the AF-ROAAS protection mode recommend a go around maneuver to the pilot, for example, if the vehicle descends below a threshold altitude. If the pilot authorizes the go around maneuver, the AFCS may perform an automated go around maneuver.

The method 400 may end at 422. In some embodiments, the method 400 may end in response to the vehicle landing.

The systems and methods disclosed herein provide various benefits over certain existing systems and methods. For example, the likelihood of a go around maneuver being necessary may be reduced by the AF-ROAAS reducing the energy state of the vehicle during approach. In addition to promoting safety, this may promote efficiency and reduce fuel consumption.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for an aerial vehicle, comprising:
   monitoring, with a runway overrun awareness and alerting system (ROAAS) of the aerial vehicle, flight parameters during an approach phase and/or a landing phase of a flight of the aerial vehicle;

continuously or periodically determining, with the ROAAS, a landing distance value for the aerial vehicle based on the flight parameters;

comparing the landing distance value and an available runway length value or value(s) derived therefrom to a threshold criterion to determine whether the threshold criterion is met, wherein the threshold criterion corresponds to a likelihood of a runway excursion;

automatically activating an automatic flight runway overrun awareness and alerting system (AF-ROAAS) protection mode of an automatic flight control system (AFCS) of the aerial vehicle in response to a determination that the threshold criterion is met;

adjusting, with the AFCS, energy of the aerial vehicle during the approach phase and/or the landing phase of the flight to reduce the likelihood of the runway excursion;

automatically generating an alert in response to the AF-ROAAS protection mode being active when the aerial vehicle drops below a threshold altitude; and performing, with the AFCS, an automatic go around maneuver in response to receiving a go around command.

2. The method of claim 1, wherein the AFCS automatically adjusts energy of the aerial vehicle while in the AF-ROAAS protection mode.

3. The method of claim 1, wherein the AFCS generates recommended corrective actions to a pilot of the aerial vehicle while in the AF-ROAAS protection mode.

4. The method of claim 3, wherein the AFCS performs the recommended corrective actions in response to receiving a command from the pilot to perform the recommended corrective actions.

5. The method of claim 1, wherein the AF-ROAAS protection mode is active during the approach phase, and the AFCS automatically adjusts the energy of the aerial vehicle by performing one or more of setting more aggressive control gains, opening rate/acceleration limits for thrust reduction, and deploying one or more drag devices.

6. The method of claim 1, wherein the AF-ROAAS protection mode is active during the landing phase, and the AFCS automatically adjusts the energy of the aerial vehicle by performing one or more of adjusting a flare height, applying a higher g load flare maneuver, idling thrust, and adjusting reverse thrust and/or braking settings to reduce the landing distance during landing.

7. The method of claim 1, wherein comparing the landing distance value and the available runway length value or the value(s) derived therefrom to the threshold criterion includes determining a status value by dividing the landing distance value by the available runway length value and comparing the status value to a threshold value, and wherein the determination that the threshold criterion is met occurs when the status value exceeds the threshold value.

8. The method of claim 1, wherein the flight parameters include one or more of aerial vehicle speed, current altitude, aerial vehicle state, auto-brake setting, landing weight, wind conditions, and dry and wet runway state.

9. The method of claim 1, wherein the threshold altitude is 200 ft.

10. A system for an aerial vehicle, comprising:

a runway overrun awareness and alerting system (ROAAS) configured to:

monitor flight parameters during an approach phase and landing phase of a flight; and continuously or periodically determine a landing distance value for the aerial vehicle based on the flight parameters;

an automatic flight control system (AFCS) including an automatic flight runway overrun awareness and alerting system (AF-ROAAS) protection mode configured to adjust energy of the aerial vehicle during the approach phase and/or the landing phase of the flight to reduce a likelihood of the aerial vehicle overrunning a runway; and a controller in operable communication with the ROAAS and the AFCS, the controller configured to, with one or more processors:

compare the landing distance value and an available runway length value or overrun-related value(s) derived therefrom to a threshold criterion to determine whether the threshold criterion is met, wherein the threshold criterion corresponds to the likelihood of the aerial vehicle overrunning the runway; and automatically activating the AF-ROAAS protection mode in response to a determination that the threshold criterion is met, wherein the AFCS is configured to generate recommended corrective actions to a pilot of the aerial vehicle while in the AF-ROAAS protection mode to reduce an energy state of the aerial vehicle, wherein the AFCS is configured to perform the recommended corrective actions in response to receiving a command from the pilot to perform the recommended corrective actions.

11. The system of claim 10, wherein the AFCS is configured to automatically adjust the energy of the aerial vehicle while in the AF-ROAAS protection mode to reduce an energy state of the aerial vehicle.

12. The system of claim 10, wherein the AFCS is configured to automatically adjust the energy of the aerial vehicle in response to the AF-ROAAS protection mode being active during the approach phase by performing one or more of setting more aggressive control gains, opening the rate/acceleration limits for thrust reduction, and/or deploying one or more drag devices of the aerial vehicle.

13. The system of claim 10, wherein the AFCS is configured to automatically adjust the energy of the aerial vehicle in response to the AF-ROAAS protection mode being active during the landing phase by performing one or more of adjusting a flare height, applying a higher g load flare maneuver, idling thrust, and adjusting reverse thrust and/or braking settings to reduce the landing distance during landing.

14. The system of claim 10, wherein the AFCS is configured to automatically generate an alert in response to the AF-ROAAS protection mode being active when the aerial vehicle drops below a threshold altitude, and perform an automatic go around maneuver in response to receiving a go around command.

15. The system of claim 10, wherein the controller is configured to, with the one or more processors:

compare the landing distance value and the available runway length value or the value(s) derived therefrom to the threshold criterion by determining a status value by dividing the landing distance value by the available runway length value and compare the status value to a threshold value; and determine that the threshold criterion is met in response to the status value exceeding the threshold value.

16. The system of claim 10, wherein the AFCS is configured to display the recommended corrective actions on a display device onboard the aerial vehicle.

17. An aerial vehicle, comprising:

a runway overrun awareness and alerting system (ROAAS) configured to:

monitor flight parameters received from a sensor system of the aerial vehicle during an approach phase and landing phase of a flight; and continuously or periodically determine a landing distance value for the aerial vehicle based on the flight parameters;

an automatic flight control system (AFCS) including an automatic flight runway overrun awareness and alerting system (AF-ROAAS) protection mode configured to adjust energy of the aerial vehicle during the approach phase and/or the landing phase of the flight to reduce a likelihood of the aerial vehicle overrunning a runway; and a controller in operable communication with the ROAAS and the AFCS, the controller configured to, with one or more processors:

compare the landing distance value and an available runway length value or overrun-related value(s) derived therefrom to a threshold criterion to determine whether the threshold criterion is met, wherein the threshold criterion corresponds to the likelihood of the aerial vehicle overrunning the runway, wherein comparing the landing distance value and the available runway length value or the value(s) derived therefrom to the threshold criterion includes determining a status value by dividing the landing distance value by the available runway length value and compare the status value to a threshold value and determining that the threshold criterion is met in response to the status value exceeding the threshold value; and automatically activating the AF-ROAAS protection mode in response to a determination that the threshold criterion is met.

18. The aerial vehicle of claim 17, wherein the AFCS is configured to automatically adjust energy of the aerial vehicle in response to the AF-ROAAS protection mode being active during the approach phase by performing one or more of setting more aggressive control gains, opening the rate/acceleration limits for thrust reduction, and deploying one or more drag devices of the aerial vehicle.

19. The aerial vehicle of claim 17, wherein the AFCS is configured to automatically adjust energy of the aerial vehicle in response to the AF-ROAAS protection mode being active during the landing phase by performing one or more of adjusting the flare height, applying a higher g load flare maneuver, idling thrust, and adjusting reverse thrust and/or braking settings to reduce the landing distance during landing.

20. The aerial vehicle of claim 17, wherein the AFCS is configured to automatically generate an alert in response to the AF-ROAAS protection mode being active when the aerial vehicle drops below a threshold altitude, and perform an automatic go around maneuver in response to receiving a go around command.

* * * * *